April 29, 1952
L. NISOLLE
2,595,164
STEAM POWER PRODUCING PLANT WORKING WITH
TWO WATER SOURCES, THE DIFFERENCE OF
TEMPERATURE OF WHICH IS SMALL
Filed April 18, 1946
6 Sheets-Sheet 1
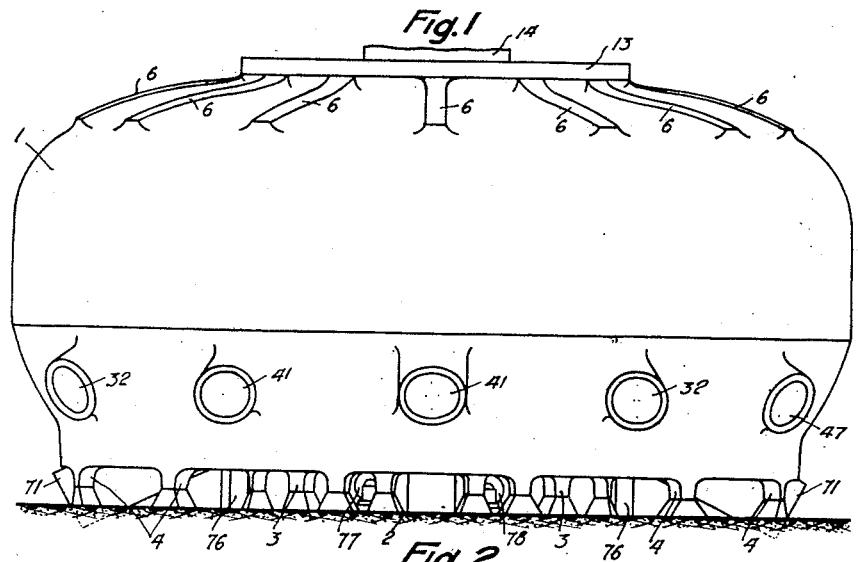
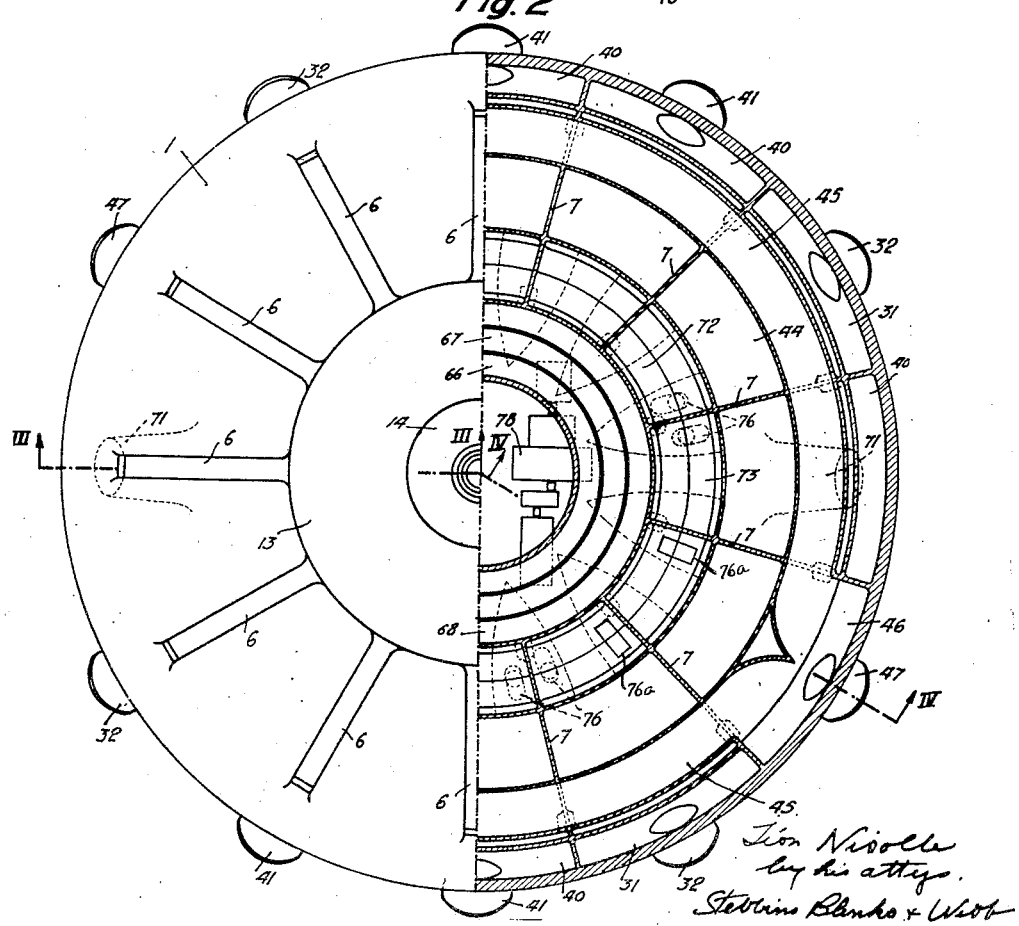

April 29, 1952
L. NISOLLE
2,595,164
STEAM POWER PRODUCING PLANT WORKING WITH
TWO WATER SOURCES, THE DIFFERENCE OF
TEMPERATURE OF WHICH IS SMALL
Filed April 18, 1946
6 Sheets-Sheet 4
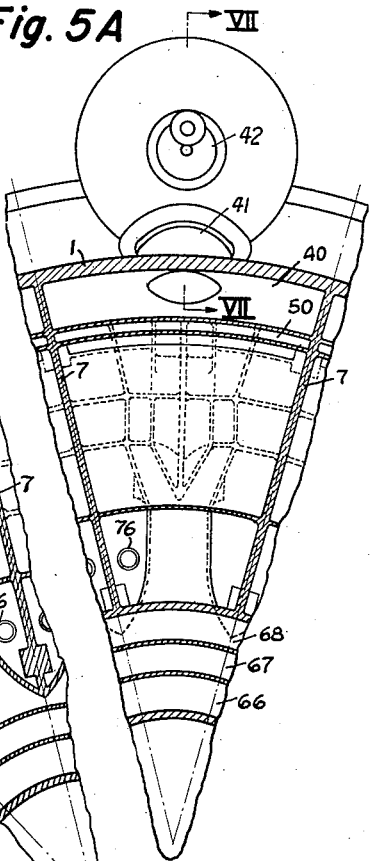
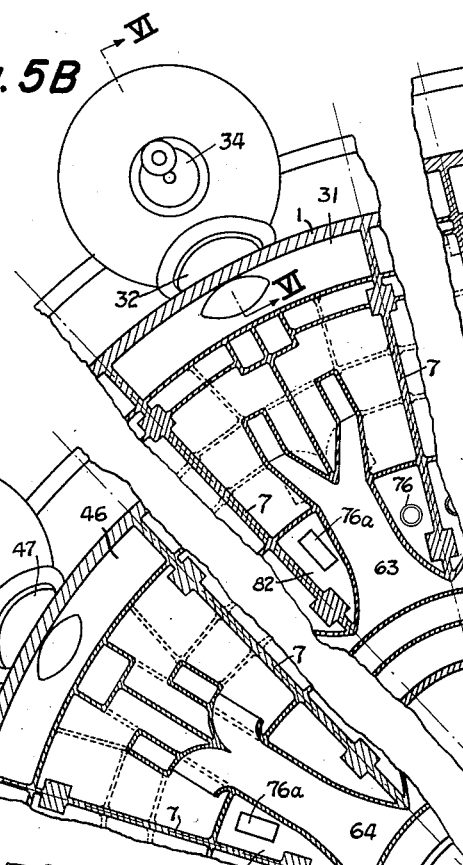
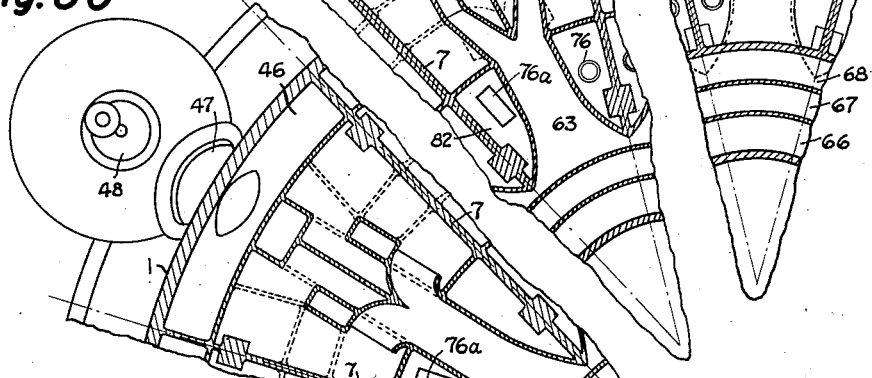
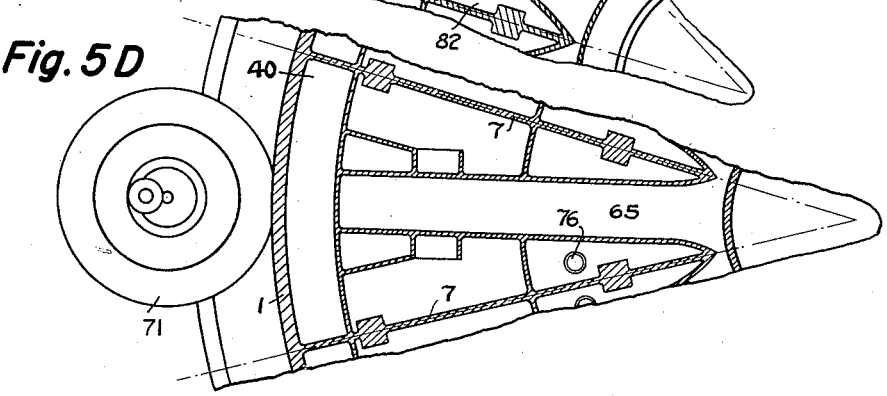
INVENTOR.
Léon Nisolle
BY
HIS ATTORNEYS

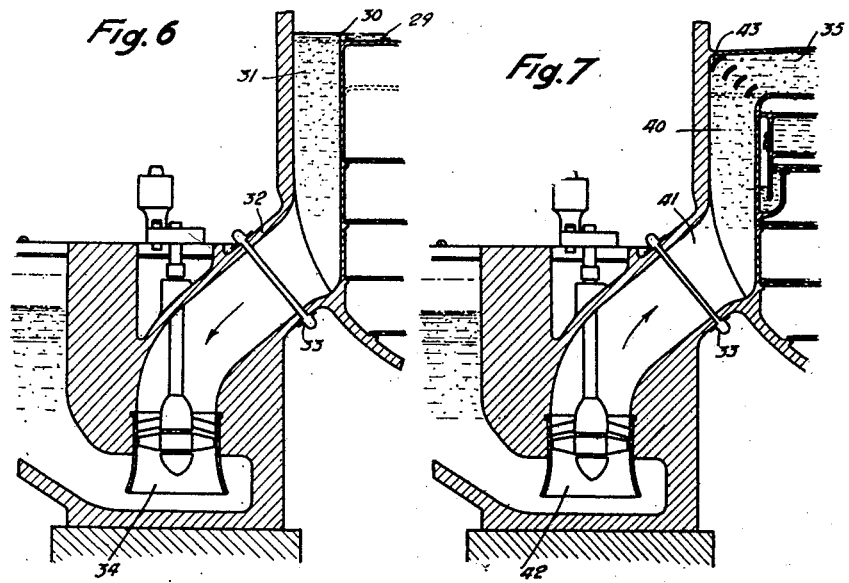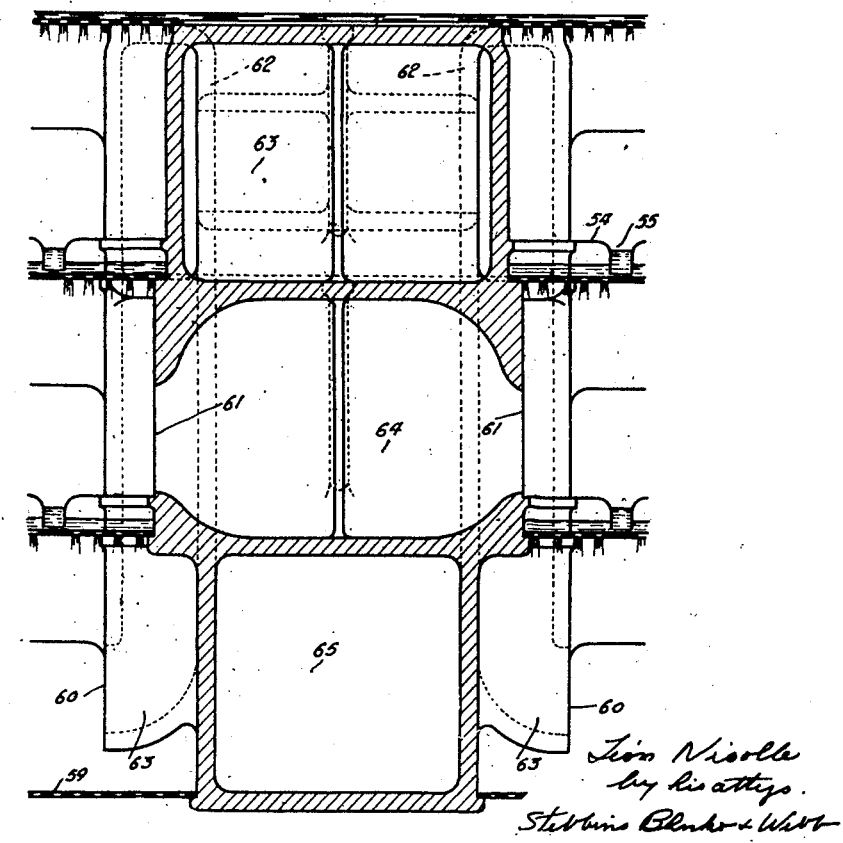

Patented Apr. 29, 1952

2,595,164

UNITED STATES PATENT OFFICE 2,595,164

STEAM POWER PRODUCING PLANT WORKING WITH TWO WATER SOURCES, THE DIFFERENCE OF TEMPERATURE OF WHICH IS SMALL

Léon Nisolle, Paris, France, assignor to Centre National de la Recherche Scientifique, Paris, France, a corporation of France Application April 18, 1946, Serial No. 663,040
In France March 24, 1943

Section 1, Public Law 690, August 8, 1946
Patent expires March 24, 1963

18 Claims. (Cl. 290—2)

It has already been proposed to operate power producing devices, more particularly turbines, by means of "ocean steam," i. e. steam produced through evaporation of warm water taken in the vicinity of the surface of the seas, preferably in tropical regions, said steam being condensed by means of cold water taken in the deeper strata of the same sea.

In such a case the necessary installations for evaporating the water, condensing the steam and circulating the water as well as the steam take up a considerable space owing to the large volumes of water and steam which must be moved. Furthermore, the necessity of maintaining a high vacuum in the whole of the enormous rooms in which the evaporation, the power production and the condensation are achieved makes the installation of the vacuum pumps difficult and gives rise to problems concerning the tightness and the resistance of the rooms to pressure, the solution of which is very difficult.

The present invention relates to such an installation working between two sources of water the temperatures of which are both rather low and near to one another, said installation being accordingly able to use the difference of temperature between the surface and the deeper strata of the sea. Said installation makes it possible to provide in a relatively small space, the various above mentioned apparatus and piping and thus to do away with most of the pressure losses which, in the present case, have a great influence on the power yield of the installation.

According to the present invention, the installation comprises an outer casing shaped approximately as a hollow tore with a vertical axis, inside which are placed the steam generators and condensers as well as the steam and water circulation piping, degassing devices for the incoming water, the steam distribution piping and the blades of one or several turbine wheels having the same axis as the casing.

The said outer casing may be, for instance, partially or wholly made of reinforced concrete. It may further be made of metal.

Owing to the compact disposition of the device and the double curvature of the casing walls, the latter can resist, without being very thick, outer pressures around 1 kg./cm.² and the production and maintenance of the vacuum inside the device are greatly facilitated.

The distribution piping supplying steam to the turbine blades is preferably movable, so as to allow an easy assembly and disassembly of the wheel. In such a case, it is advantageous to build them out of metal, in the form of a rigid assembly which can be taken out as a single piece, said assembly being for instance introduced into a cylindrical recess, having the same axis as the casing and provided at the upper part of the said casing.

To feed the installation with warm and cold water, pumps supplying the water and pumps evacuating it are placed for instance around the casing. The object of the said double set of pumps for each water circuit is to avoid the energy losses which would certainly take place when the tide varies the level of the sea. If one considers for instance the warm water circuit, the level and pressure of the water arriving on the evaporting surfaces should be constant while the level where the said water is taken in the sea and the level where it is thrown back are variable. Accordingly, while the total pressure necessary for circulating the water is constant, it is constantly divided in a different manner between the incoming circuit and the outlet circuit. By employing in each part of the circuit a pump yielding a manometric pressure which can be regulated, either by its rotation speed or by the orientation of its blades (if it is a screw pump), one may at each moment regulate the pressure to the strictly necessary value. If on the contrary one single pump had to fulfill the two functions, the regulation of the output could be achieved only by providing in the incoming and outlet piping valves which, acting by regulating the flow, would create a loss of pressure which must be compensated by the single pump.

With two pumps or two groups of pumps, the total of the manometric pressures yielded stays substantially constant and is equal to the total of the pressure losses which cannot be avoided and which would exist even if the level of the sea remained constant.

The casing of the installation being particularly apt to constitute by itself the outer wall of the whole power plant, it is advantageous in such a case to protect it against solar radiation, for instance by paints spread in zones having different absorbing powers according to the orientation with respect to the direction of sun rays. The object of such a disposition is to ensure a substantial constancy of temperature all along the said surface, notwithstanding the daily variations of the solar radiation, due to the very great flow of water circulating along the said walls, this water having a temperature which is constant or only slightly variable with time.

The whole tore-shaped casing rests on a base, for instance through the medium of posts a certain number of which may be mounted on rollers so as to allow dilatation, said posts leaving between them openings and free passages for the service gangs and the mechanical elements which are to take their place in the center of the casing.

The annexed drawings show an example of an installation according to the invention. In the said drawings:

Fig. 1 is an elevational outer view of the said installation;

Fig. 2 is a plan view with partial section through line II—II of Fig. 4;

Figs. 5A, 5B, 5C and 5D are partial sections taken respectively on lines VA—VA, VB—VB, VC—VC and VD—VD of Fig. 3;

Fig. 6 is part of a sectional view through line VI—VI of Fig. 5B;

Fig. 7 is part of a sectional view through line VII—VII of Fig. 5A;

Fig. 9 is a sectional view through line IX—IX of Fig. 8.

Figure 3:
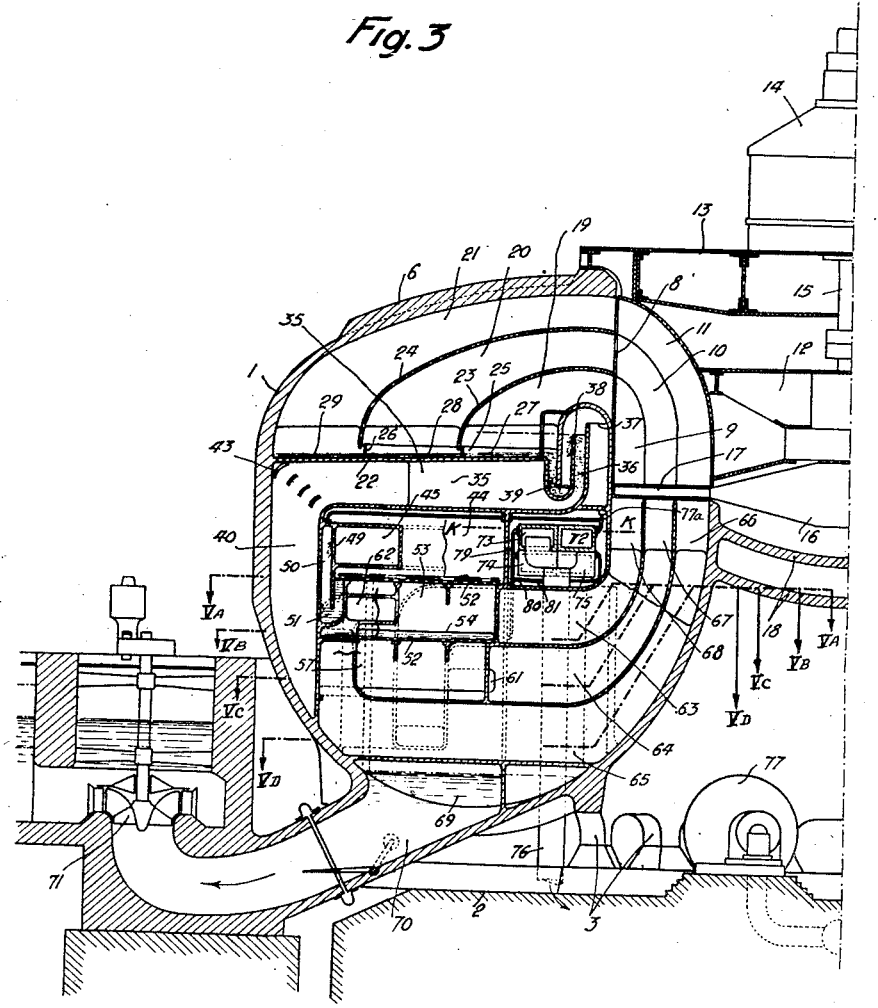
Fig. 3 is a half sectional view through line III—III of Fig. 2, at a greater scale.

Referring to the appended drawings, the installation comprises a casing 1 of reinforced concrete, shaped approximately as a vertical axis tore, supported on a base 2 by two concentric series of posts 3 and 4, the outer posts 4 being mounted on rollers 4a so as to allow the free dilatation of the casing. The upper part of the latter is provided with reinforcing ribs 6.

The casing is internally divided into twelve sectors or compartments by means of separating partitions 7. The said compartments are connected with the exterior through piping the detail of which will be given hereafter.

The upper part of casing 1 nearest to the axis is hollowed out to form a cylindrical recess 8 inside which is placed a removable body formed by conduits 9, 10 and 11 concentrically placed and radially partitioned, braced by a beam 12.

On the top of casing 1 rests a circular lid 13 supporting a generator 14 and from the lid is suspended a shaft 15 carrying a horizontal turbine wheel 16 the blades 17 of which are concentrically partitioned so as to form three rings corresponding to conduits 9, 10 and 11. Wheel 16 is placed at the bottom of the cylindrical recess 8.

A double inverted dome 18 made of reinforced concrete ensures the rigidity of the whole casing 1.

Each compartment of casing 1 formed by partitions 7 is internally fitted in the following way:

At the end of conduits 9, 10 and 11 are three pipes 19, 20 and 21 which end above a conical surface 22 slightly sloped from a horizontal plane, sloping downwardly towards the outside of the casing. Said conical surface 22 is divided, by partitions 23 and 24 which form the pipes 19, 20 and 21 and by adjustable metallic valves 25 and 26 which extend below the partitions, into three communicating parts forming the evaporators 27, 28 and 29. The separating partitions 7 are interrupted on the level of the evaporators so that the latter form a continuous ring on the whole periphery of casing 1. In four of the compartments, situated on two perpendicular diameters, the water from evaporator 29 flows out, over a slight weir 30, into a pipe 31 extending down along the outer wall of the casing 1 and leading to the exterior through a pipe 32. The latter is connected, with interposition of an elastic joint 33, with a screw pump 34 (see Fig. 6).

Immediately below the evaporators is a series of boxes 35 communicating with one another at their extremity nearest to the axis of casing 1. At the said extremity, the boxes are connected to the lower part of a ring 36 the height of which is greater than its breath and which runs around the whole casing 1 and is formed, in its upper part, into a bell-shaped tank 37. The outer wall of ring 36 ends in its upper part in a series of blades 38 leaving between them very small intervals. The bell-shaped tank 37 is connected, through a siphon 39, with evaporator 27.

On the other hand, for four of the compartments formed by the partitions 7 in the casing, diametrically opposite to one another and placed side by side two by two, the box 35 is connected with a pipe 40 (see Fig. 7) going down along the outer wall of the casing and opening outside through a pipe 41. The latter is connected by a tight joint 33, to a screw pump 42. Director blades 43 may be placed at the connecting point between boxes 35 and pipes 40.

Figure 4:
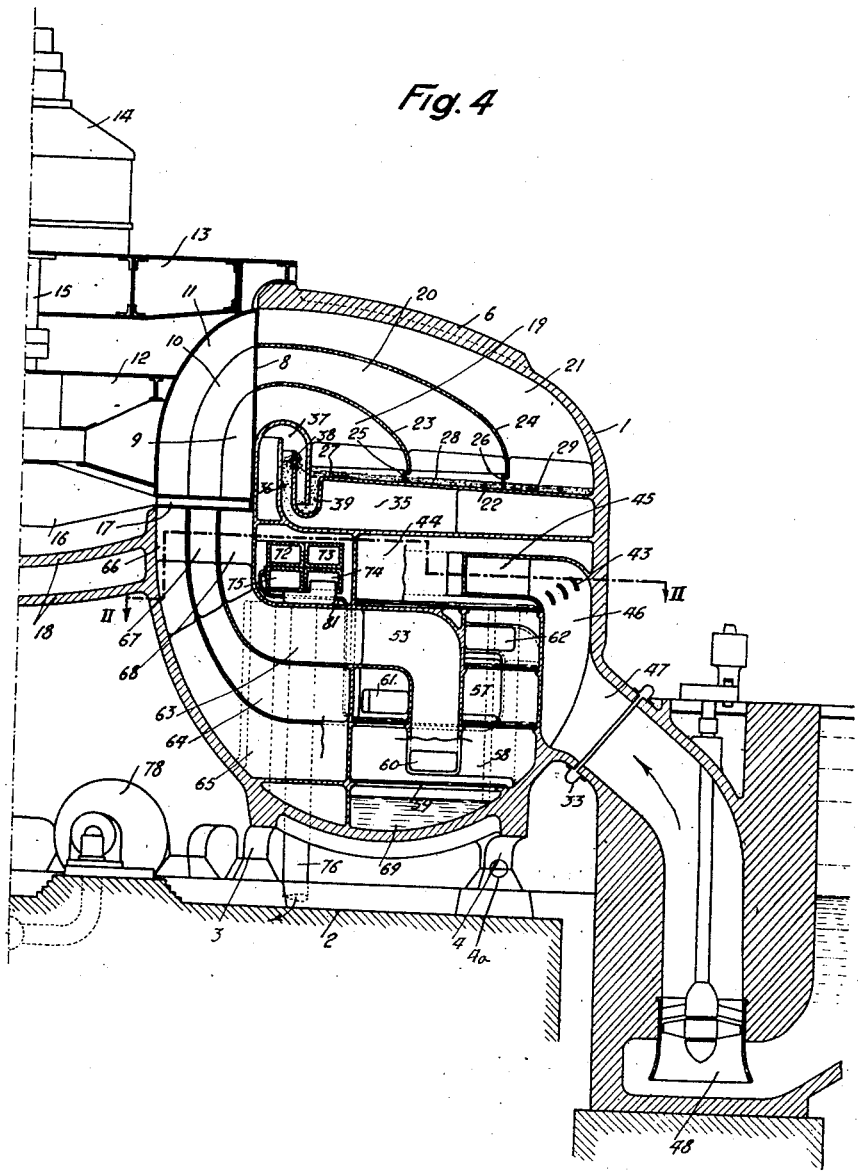
Fig. 4 is a half sectional view similar to the preceding one through line IV—IV of Fig. 2.

Below boxes 35 is a free space 44 in which is provided a pipe 45 formed of two half-rings joined at their diametrically opposite extremities to pass out into pipe 46 occupying a similar position to that of pipes 31 or 40 and communicating with the exterior through pipes 47 connected by a tight joint 33, with a screw pump 48 (see Fig. 4). Director blades such as 43 may also be provided.

Pipe 45 (see Fig. 8) is connected, through openings 49 closed by perforated plates, with a ring 50 the height of which is greater than its breath and the lower part of which dips into a siphon 51 which supports a horizontal perforated plate 52 braced by reinforced concrete joints, the said plate forming the upper wall of a condenser 53. The bottom of the latter consists of a concrete slab 54 perforated with holes 55 regularly spaced for instance on three concentric circles centered on the axis of the casing. The holes are extended downwards by short tubes 56 which extend nearly down to the plate 52 which forms the upper wall of a condenser 57 similar to the preceding condenser, followed in its turn with another condenser 58 provided with a simple perforated bottom 59.

The three condensers 58, 57 and 53 are connected through apertures 60, 61 and 62, to three radial superposed pipes 65, 64 and 63 (see Fig. 9), connected in their turn with pipes 66, 67 and 68 connected respectively with the above mentioned conduits 11, 10 and 9. The upper pipe 63 connected to the lower condenser 58 is divided in two parts so as to pass downward on both sides of pipes 64 and 65. In the same way, the lower pipe 65 connected to the upper condenser 53 is extended beyond the extremities of pipes 63 and 64 and then rises toward condenser 53.

The lower part of the casing, situated under the condensers, forms an annular collector 69 connected through two pipes 70 placed diametrically opposite one another to two centrifugal screw pumps 71.

In the space 44 are also provided four annular conduits or air collectors 72, 73, 74 and 75, respectively connected, through vertical pipes 76, with the four stages of two air extraction pumps 77 and 78 placed in the empty part provided in the center of the installation and one of which is a spare pump. Pipe 71a connects the four collectors with the de-gassing device 37. Pipes 79, 80 and 81 connect the collectors with the three condensers.

The extracted air from the air-collectors 72-75 which communicate with the warm water de-gassing bell 37 and with the condensers 53, 57 and 58, is partially freed from the accompanying vapor by refrigerators 76a, in order to decrease the necessary power for the air-extraction pumps 77 and 78. Refrigerators are preferably located in compartments 82 where no pipe 76 passes.

The installation works as follows:

The warm water, at a temperature of say 30° C., taken in the vicinity of the surface of the sea, is forced by the four pumps 42 (see Figs. 5 and 7) into pipes 40 and therefrom into the boxes 35. It then passes into ring 36 and overflows into the bell-shaped tank 37, passing between blades 38 which divide it into thin sheets. In such a state of division, it is de-gassed under a vacuum of about 0.150 kg., created by the first stage of say pump 77, connected with bell 37 through pipe 76, conduit 72 and pipe 71a.

The thus de-gassed water is then sent into evaporator 27 through the siphon 39 forming a hydraulic seal between the extractor 37 and the evaporators, the evaporators being maintained at a much higher vacuum than the extractor. From evaporators 27, the water runs successively to evaporators 28 and 29, the thickness of the water sheet submitted to evaporation being adjusted in each case by opening or closing valves 25 and 26. The temperature of the water in each evaporator may for instance be respectively 29, 28 and 27° C.

The nonevaporated warm water, which forms—except for 5/1000—the totality of the distributed water, flows over weirs 30 (see Fig. 6) and is discharged through pipes 31 and 32 and warm water extraction pumps 34.

The three steam flows, having different temperatures and pressures, are evacuated through pipes 19, 20 and 21 and are brought, through distribution rings 9, 10 and 11, into the three blade rings 17 of wheel 16, where they expand respectively to pressures corresponding for instance to 19, 16 and 13° C.

At the outlet of blades 17, the steam flows are brought respectively through conduits 66, 67 and 68 then 63, 64 and 65 to condensers 58, 57 and 53 into which they enter by the lateral openings 60, 61 and 62. The extraction pump 77 creates inside the condensers, through vertical pipes 76, annular pipes 73, 74 and 75 and pipes 79, 80 and 81, vacuums corresponding for instance respectively to 19, 16 and 13° C.

Figure 8:
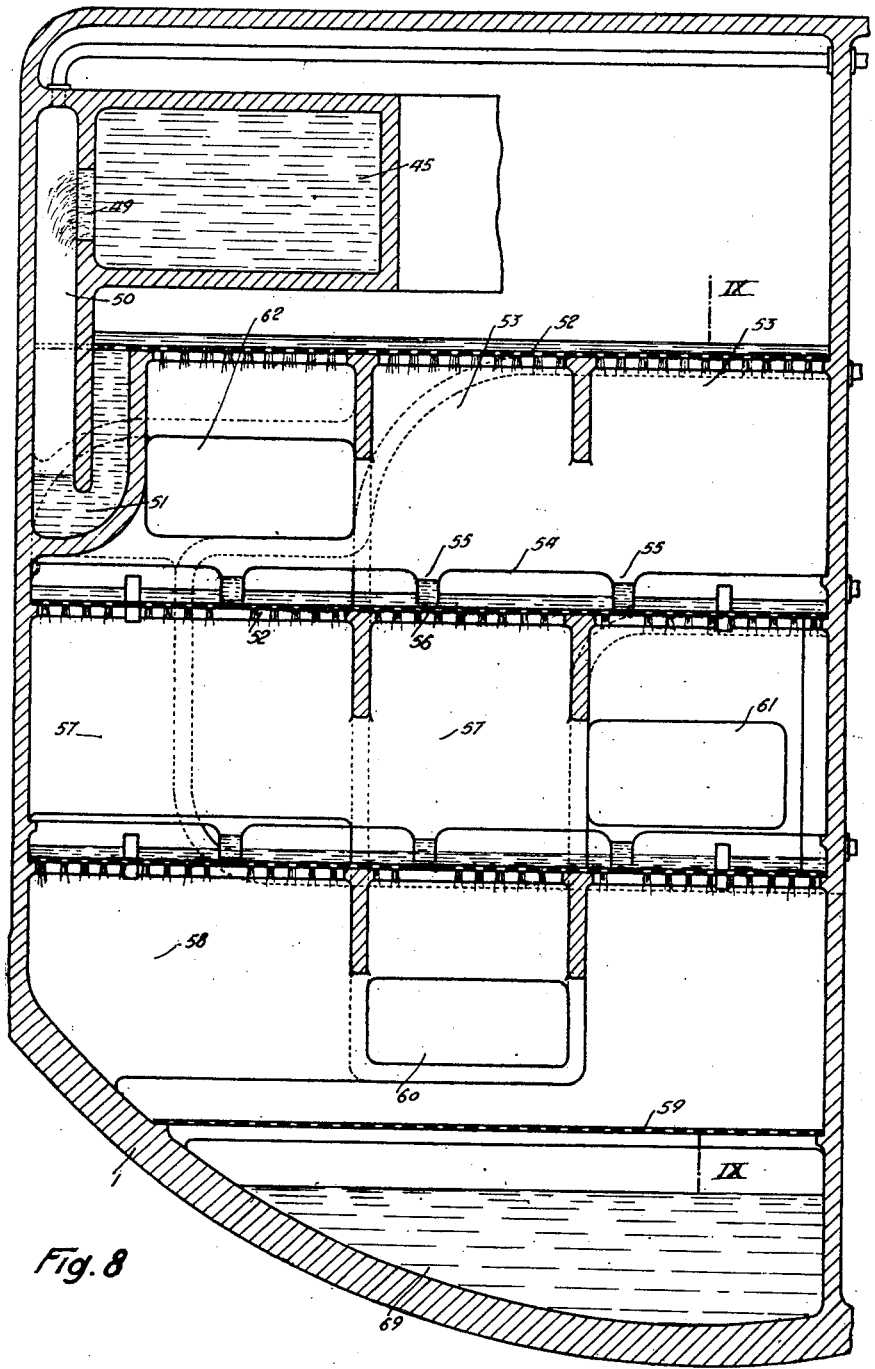
Fig. 8 is a detail, at a greater scale, of Fig. 3.

On the other hand the cold water, taken from the deeper strata of the sea, for instance at a temperature of 8-10° C., is forced by pumps 48 (see Fig. 4) into pipes 46 and annular pipes 45 (see Fig. 8). Therefrom it flows, through perforated plates 49, to the de-gassing bell 50 maintained under vacuum by the air extraction pump 77 in a similar manner to de-gassing device 37.

After having been de-gassed, the cold water passes through siphon 51 and spreads on plates 52 through which it flows into the first condenser 53 in which has been created the highest condensation vacuum. The said water encounters the steam coming from pipes 65 and condenses it, then it is collected in the lower part and flows out through openings 55 of slab 54.

Tubes 56, the total cross-section of which is small with respect to the bottom surface 54 of the condenser, are numerous enough for the water level which establishes itself in the said tubes and which shows the difference of pressures between condenser 53 and the following condenser 57 to remain inside the tubes and not to come above the bottom of the condenser 53. This ensures that the abnormal pressure differences which may take place between the condensers is manifested only by strong variations of the level inside the communication tubes 56, without any visible variation of the water level on the perforated plates of the condenser 58, which ensures a substantially constant flow of water.

The water from condenser 53 then flows onto the plate 52 forming the upper wall of condenser 57 and the perforations of which are calculated so that the water level above the said plate is maintained at a depth of about 20 cm. It then streams into condenser 57, condenses the steam present in said condenser and then flows in the same way into condenser 58.

At the lower part of casing 1, the water coming out of condenser 58 at a temperature of say 19° C. is collected in collector 69 and is removed from the latter by pumps 71 (see Fig. 3).

The turbine wheel 16 drives the generator 14 which is the source of directly usable power. A part of the power thus produced by the generator is used for driving the various auxiliary devices: air extraction pumps 77 and 78, water circulating pumps 34, 42, 48 and 71, air cooling pumps and pumps for bringing to the installation the sea water taken from the deeper strata of the sea.

It should be noted that the warm water circulating pumps are in a greater number than those for circulating the cold water. In view of the small quantity of water evaporated in each evaporator, the volume of warm water which is to be circulated is about three times greater than that of the cold water.

As an example, an installation producing 14,500 kw., 5,500 of which are used for moving the auxiliary devices, working at the above mentioned temperatures necessitates the use of eight warm water circulation pumps having each and output of 10.5 m.$^3$/s. and of four cold water circulation pumps having only an output each of 7 m.$^3$/s. The volume of steam is approximately 13,500 m.$^3$/s. The diameter of the turbine wheel is then about 14 m.

The outer walls of casing 1 may be protected in any known manner against solar radiation and the inner walls may be heat insulated at those parts which are in contact with the cold water, i. e. corresponding to pipes 46 and collector 69, so as to avoid unequal dilatations of said casing, such dilatations entailing possible cracks and air inlets.

What I claim is:

1. A steam power producing plant capable of working between two sources of water, one a hot source and the other a cold source, the difference of temperatures of which is very small and in which the work steam is produced from the hot source in steam generators, said steam being condensed after expansion by means of the water of the cold source, the said plant comprising on the one hand an outer continuous and tight casing shaped approximately as a hollow tore with a vertical axis, a shaft coaxial with said casing, a turbine wheel on said shaft having peripheral blades arranged in the central part of said casing, a unit formed by successive steam generators and condensers wholly in said casing, inlet piping in said casing for leading the water from the hot source to said steam generators and the water from the cold source to said condensers respectively, discharge piping from the condensers, and piping for leading the work steam from said generators to said turbine blades and from said blades to said condensers, and on the other hand peripheral pumps arranged around the toric casing and connected with the inlet and outlet piping for the cold and warm water.

2. A steam power producing plant capable of working between two sources of water, one a hot source and the other a cold source, the difference of temperatures of which is very small and in which the work steam is produced from the hot source in steam generators, said steam being condensed after expansion by means of the water of the cold source, the said plant comprising an outer continuous and tight casing shaped approximately as a hollow tore with a vertical axis, means tightly closing the upper part and the lower part of the free space provided in the axial part of said toric casing, journal means fast with said means, a shaft coaxial with said casing and rotatively supported by said journal means, a turbine wheel on said shaft having peripheral blades arranged in the central part of said casing, a unit formed by successive steam generators and condensers wholly in said casing, inlet piping in said casing for leading the water from the hot source to said steam generators and the water from the cold source to said condensers respectively, discharge piping from the condensers, and piping for leading the work steam from said generators to said turbine blades and from said blades to said condensers, and on the other hand peripheral pumps arranged around the toric casing and connected with the inlet and outlet piping for the cold and warm water.

3. A plant according to claim 2, in which the upper part of the casing nearest to the axis is formed with a cylindrical recess, and a removable ring unit formed of the piping for leading the steam from the generators to the turbine blades closely fitting in said recess.

4. A plant according to claim 2 in which water de-gassing devices are inserted in the inlet piping lead from the hot water source to the steam generators and in the piping leading from the cold water source to the condensers.

5. A plant according to claim 2, in which the toric casing rests on a base by means of posts leaving between one another a sufficient free space to allow a free access under said casing.

6. A plant according to claim 2, in which the steam generators are formed of evaporators.

7. A plant according to claim 2, in which the means tightly closing the free space provided in the axial part of the toric casing are respectively in its upper part and in its lower part a tight lid-forming structure and a continuous air-tight wall.

8. A plant according to claim 6, in which the evaporators are constituted by substantially conical surfaces on which the hot feed water streams down in spread layers.

9. A plant according to claim 6, in which the evaporators are constituted by a unit of vertical piping open in their upper part over the top of which the warm feed water flows and then streams down on their outside walls.

10. A plant according to claim 7, in which the tight lid-forming structure is a metallic one.

11. A plant according to claim 2, in which the range of temperatures between the two working sources is comprised between about 15° and 20° C.

12. A plant according to claim 2, in which the temperatures of the cold and hot working sources are of the order of 5 to 10° C. and 25 to 30° C. respectively.

13. A plant according to claim 6, in which the evaporators comprise water fountain devices in which the warm water feed springs up through small vertical openings.

14. A plant according to claim 6, in which the evaporators are constituted by boxes having perforated ceilings through which the warm feed water streams down like a shower.

15. A plant according to claim 2, in which the condensers are jet condensers.

16. A plant according to claim 2, in which the condensers are jet condensers and constituted by boxes having perforated ceilings through which the water streams down in a shower.

17. A plant according to claim 6, in which the evaporators are arranged in the upper part of the casing and the condensers in the lower part, the inlet piping for the warm and cold water being located between the evaporators and the condensers and the lower part of the casing forming a collector for the water which has been used for the condensation.

18. A plant according to claim 6, in which an electric generator is mounted on the lid, the rotor of which is connected with the shaft coaxial with the toric casing.

LÉON NISOLLE.

REFERENCES CITED

The following references are of record in the file of this patent:

UNITED STATES PATENTS

| Number | Name | Date |
|---|---|---|
| 1,566,872 | Ishizaka | Dec. 22, 1925 |
| 1,804,694 | Jones | May 12, 1931 |
| 1,952,520 | Urquhart | Mar. 27, 1934 |
| 2,006,985 | Claude et al. | July 2, 1935 |
| 2,075,648 | Hüttner | Mar. 30, 1937 |